July 1, 1969     M. G. ROLAND     3,453,007
PNEUMATIC SELF-SEALING PLUG-IN COUPLING
Filed Jan. 9, 1967
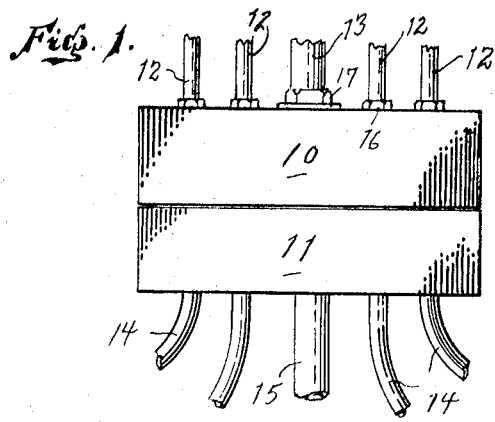
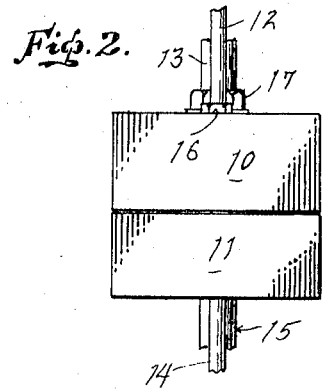
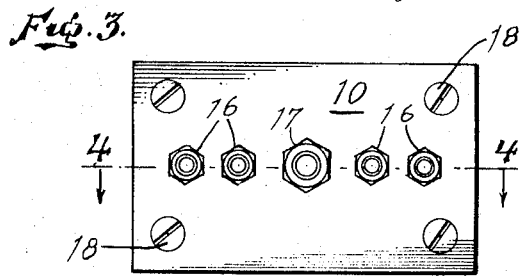
INVENTOR.
MAX G. ROLAND.
BY
*Wm H. Atkinson*
ATTORNEY United States Patent Office 3,453,007
Patented July 1, 1969

3,453,007
PNEUMATIC SELF-SEALING PLUG-IN
COUPLING
Max G. Roland, San Carlos, Calif., assignor of one-half interest to William H. Atkinson, San Francisco, Calif.
Filed Jan. 9, 1967, Ser. No. 608,061
Int. Cl. F16l *33/00, 39/00*
U.S. Cl. 285—137                                      5 Claims

ABSTRACT OF THE DISCLOSURE

A separable multiple fluid conduit coupling having separable male and female parts which, when secured together, will form a connection between a number of closely spaced flexible connecting conduits. The male member of the coupling has a conduit aligning nipple with an overlapping flexible tubular connection extending from the face thereof, said overhanging portion of the extending hose connection is adapted and arranged to be compressed about said nipple and form a seal between the male and female portions of the coupling without resort to threaded coupling members, gaskets or other sealing means, the advantage being that a large number of fluid connections for modular fluid operated apparatus can be arranged in close proximity where the conventional threaded coupling members with sealing gaskets are impractical.

---

My present invention relates to fluid couplings and more particularly to couplings of the plug-in type having male and female parts for making fluid under pressure connections between one or more modular units of a complete assembly and more particularly to a coupling by which flexible fluid conducting connections may be established and sealed in a novel manner without the use of O-rings, gaskets, or the like.

Another object of the invention is to provide self-sealing plug-in type of coupling which is inexpensive, simple in construction and effective when in use.

In the manufacture of modular type units such as are employed in large computer assemblies and other miniaturized automated controls it is the practice to provide plug-in type connectors involving male and female parts for establishing electrical connections between the several units, but up to the present time, so far as I have been advised, there has not as yet been provided a coupling of the plug-in type for use independently of or in conjunction with electrical circuit connectors for establishing an operating fluid under pressure connection where air and/or water is used as a motivating force in lieu of electromagnetic means and it is therefore, a further object of the invention to provide a coupling of the type disclosed for this particular use.

Other objects and advantages will be in part evident to those skilled in the art and in part pointed out in the following description taken in connection with the accompanying drawing showing by way of illustration and not of limitation a preferred embodiment of the invention.

In the drawing, where like numerals refer to like parts throughout the several views, FIGURE 1 is a side view of a coupling for establishing connections for water and air between an operating and an operation controlling unit, FIGURE 2 is an end view of the coupling as shown in FIGURE 1, FIGURE 3 is a plan view of the coupling as shown in FIGURE 1, FIGURE 4 is an enlarged view in section showing a portion of the interior of the coupling of FIGURE 1, FIGURE 5 is a view in section showing details in a partial engaging position, FIGURE 6 is a fragmentary view in section showing the parts in a fully engaged position, and FIGURE 7 is a face view of the male section of a modified coupling with fluid passageways arranged in circles.

By way of abstract the present invention contemplates the provision of a means for establishing fluid disconnecting connections between relatively movable parts such as the units of computer assemblies and the like of modular design and by which the different individual units of a complete installation may be assembled at a factory and shipped independently for later use with proper fluid conducting connections therebetween when the different modular units are assembled for ultimate use and is particularly adapted for use in miniaturized assemblies where space is limited and where the so called flexible spaghetti-type plastic tubing may be employed to establish operating fluid connections between the several modular units.

References is now made to the accompanying drawing wherein FIGURES 1, 2, and 3 there is shown a coupling unit that has been particularly designed for establishing fluid connections between a foot operated fluid flow control station and a supporting pedestal upon which a dental tool carrying cabinet having various dental tools is articulately supported for positioning at various points over and about a dental chair. The coupling here shown consists of a female portion 10 and a male portion 11. The female portion 10 is here shown as having a plurality of air conducting tubes 12 and a single water conducting tube 13 which may lead to various operating elements of the assembly. Likewise the male portion 11 of the coupling carries a plurality of pressurized elastomeric air-conducting flexible tubes 14 and a larger water-conducting tube 15 each of which will be of desired length for connection with a source of fluid under pressure or between any two of the relatively separable modular units of the assembly. The pipes 12 and 13 may be secured at the upper side of the portion 10 in any suitable manner. In alignment with these fluid-conducting pipes the portion 10 has passageways as will here and after appear. In this showing these pipes 12 and 13 are connected to the female portion of the coupling by suitable nipples 16 and 17. When the coupling is completed and in use the portions 10 and 11 of the coupling will be secured together by screws 18 at the points indicated in FIGURE 3 of the drawing or any other suitable means as for example clips or clamps.

While I have in the above described my invention for use in connection with a dental installation, it is to be understood that this invention will also be found equally applicable for other modular type installations where fluid connections may be required between widely or closely spaced operated units of a complete installation such as is often required between the various units of a computer installation and like devices employing fluid under pressure for the operation of various devices carried thereby.

Reference is now made to FIGURES 4, 5, and 6 of the drawing wherein there is shown the details of assembly as related to the flexible fluid conducting tubes 14 and 15. In these showings the flexible tubes 14 each carry a tubular rigid nipple 19 and the flexible tube 15 has a nipple 20 each of which extend outwardly beyond the ends of the flexible tubing associated therewith. To accommodate these nipples 19 and 20 the female portion 10 of the coupling has passageways 21 and 22 which are slightly larger in diameter than the nipples 19 and 20 so that they may be freely projected into the corresponding passageways when the coupling members are assembled. At the right of the FIGURE 4, the flexible hose 14 and its nipple 19 have been omitted to more clearly show the passageway 21 as having a counterbore 21' at the face of the female portions of the coupling. In like manner the passageway through the male portions of the coupling is of two different diameters 23 and 24 which result in the formation of an internal shoulder 25 against which a corresponding external shoulder formed upon the inserted length of hose by the inserted nipples which will serve as a means to secure each of the lengths of flexible hose against withdrawal from the coupling when finally assembled. The passageway for the larger hose 15 is similar but somewhat larger in dimensions. The difference in the diameters 23 and 24 of the fluid passageways in the male member will be determined by the thickness of the wall in the tubing to be passed therethrough. As is shown in FIGURES 5 and 6, when the coupling members are being assembled the length of flexible hose will be passed downwardly, as here viewed, through the male coupling member 11 and carried out to any desired length, however prior to this threading to the length of flexible hose through the male portion 11 of the coupling each length of the hose will be provided with its respective nipple which in practice should preferably have an outside diameter of approximately 15% larger than the interior of the tubing with which it is used. In this manner the nippled end of the tubing will be expanded in such a manner that an external shoulder 26 will be formed thereupon which when brought into engagement with internal shoulder 25 will prevent a withdrawal of the tubing therefrom. As shown the flexible lengths of tubing 14 and 15 will extend along its associated nipple for a predetermined distance depending upon the compressibility thereof and when the faces of the male and female parts have been brought into full engagement and there secured the extending predetermined length of the hoses 14 and 15 will become compressed within the counterbore 22 of the fluid passageway 21 with the result that a fluid tight seal will be established between the extending portion of the length of hose and the female portion of the coupling as shown in FIGURE 6 of the drawing.

In FIGURE 7, there is shown a modified arrangement in which the several air and water conducting passageways of the coupling members are arranged in concentric circles with certain passageways disposed in an unsymmetrical manner to avoid misalignment. With this particular embodiment of my invention it is contemplated that the coupling members may be equipped with the fluid conducting aspects as described above in combination with any conventional electrical plug-in type of contact couplings 27. The connections thus established may be in the form of a plurality of fluid conducting tubes and electrical circuit forming conductors assembled as a bundle with both the electrical and fluid pressure control tubes combined as a unitary assembly.

Having thus described my invention what I claim and desire to secure by Letters Patent:

1. In a separably coupling means for establishing fluid-conducting connections for fluids under pressure as an operating medium between individual modular and relatively moveable units of a complete assembly, the combination of a female coupling member having fluid passageways for the flow of fluid therethrough, each of fluid passageways having a counterbore at the face of said female coupling member, a male coupling member also having fluid conducting passageways therethrough for alignment with the passageways of said female member, each of said passageways in said male coupling member having an internal shoulder remote from its coupling engaging face, lengths of flexible tubing extending into said male coupling member beyond the internal shoulder in its passageway and projecting outwardly at the face thereof, and a rigid nipple forming tube extending into the ends of each of said lengths of flexible tubing and outwardly from the engaging face of said male member for insertion into the passageway beyond the counterbore at the face of said female member, characterized by the fact that said lengths of flexible tubing will be expanded by the insertion of said nipple forming tubes to form an external shoulder about said flexible tubing for engagement with the internal shoulder of said male member with portions thereof extending from the face of said male member for engagement with the counterbore at the face of said female member, the outer diameter of said nipple being substantially equal to the internal diameter of the passageway in the female coupling member, means to axially move and secure the male and female members together, whereby the end portion of each of the flexible tubes will deform and fill said counterbore and will be the sole means to provide a fluid tight seal between the male and female members when said members are in face contacting engagement.

2. The invention as set forth in claim 2, characterized by the fact that the fluid conducting hose connections carried by said male member are of flexible plastic material with a relatively thick wall and substantially no linear elasticity.

3. The invention as set forth in claim 2, characterized by the fact that the plurality of fluid conducting passageways of the male and female portions of said coupling are arranged out of symmetry to prevent misalignment thereof when the coupling is in use.

4. The invention as set forth in claim 2, characterized by the fact that the passageways of the coupling are arranged along a straight line across the face of said coupling forming members.

5. The invention as set forth in claim 2, characterized by the fact that the several fluid conducting passageways of the coupling forming male and female members are arranged in matching concentric circles.

References Cited

UNITED STATES PATENTS

| | | | |
|---|---|---|---|
| 969,216 | 9/1910 | Stephens | 285—247 |
| 2,475,468 | 7/1949 | Andrews | 285—137 X |
| 2,510,125 | 6/1950 | Meakin | 285—137 X |
| 2,663,325 | 12/1953 | Bede | 285—137 X |

FOREIGN PATENTS 137,706  1/1920  Great Britain.

THOMAS F. CALLAGHAN, *Primary Examiner.*

U.S. Cl. X.R.

285—242; 339—94